(12) United States Patent
Li et al.

(10) Patent No.: US 12,051,220 B2
(45) Date of Patent: Jul. 30, 2024

(54) POINT CLOUD ATTRIBUTE PREDICTION METHOD AND DEVICE BASED ON FILTER

(71) Applicant: Peking University Shenzhen Graduate School, Guangdong (CN)

(72) Inventors: Ge Li, Guangdong (CN); Chuang Ma, Guangdong (CN); Jing Wang, Guangdong (CN); Yi Ting Shao, Guangdong (CN); Wen Gao, Guangdong (CN)

(73) Assignee: Peking University Shenzhen Graduate School (CN)

( * ) Notice: Subject to any disclaimer, the term of this patent is extended or adjusted under 35 U.S.C. 154(b) by 215 days.

(21) Appl. No.: 17/622,268

(22) PCT Filed: May 11, 2020

(86) PCT No.: PCT/CN2020/089592
§ 371 (c)(1),
(2) Date: Dec. 23, 2021

(87) PCT Pub. No.: WO2021/142985
PCT Pub. Date: Jul. 22, 2021

(65) Prior Publication Data
US 2022/0254057 A1      Aug. 11, 2022

(30) Foreign Application Priority Data
Jan. 13, 2020   (CN) .......................... 202010034025.9

(51) Int. Cl.
*G06T 7/73*       (2017.01)
*G06V 10/74*     (2022.01)

(52) U.S. Cl.
CPC .............. *G06T 7/73* (2017.01); *G06V 10/761* (2022.01); *G06T 2207/10028* (2013.01)

(58) Field of Classification Search
None
See application file for complete search history.

(56) References Cited

U.S. PATENT DOCUMENTS 10,229,533 B2 *   3/2019   Tian ........................ G06T 17/10
2017/0347100 A1 *  11/2017  Chou ................... H03M 7/3059
(Continued)

FOREIGN PATENT DOCUMENTS

| CN | 106548460 A | 3/2017 |
|---|---|---|
| CN | 108702502 A | 10/2018 |

(Continued)

OTHER PUBLICATIONS

Lu et al., "PointNGCNN: Deep Convolutional Networks on 3D Point Clouds with Neighborhood Graph Filters" (Year: 2019).*
(Continued)

*Primary Examiner* — Hilina K Demeter
(74) *Attorney, Agent, or Firm* — The Belles Group, P.C.

(57) ABSTRACT

Provided are a point cloud attribute prediction method and prediction device based on a filter. The method comprises a coding method and a decoding method, and the device comprises a coding device and a decoding device. The method comprises: determining K nearest neighbor points of the current point; determining a filter matrix; and determining an attribute prediction value of the current point according to the filter matrix. Therefore, the compression performance of a point cloud attribute can be improved by means of selecting an appropriate filter.

12 Claims, 3 Drawing Sheets

(56) References Cited

U.S. PATENT DOCUMENTS

| | | | |
|---|---|---|---|
| 2019/0081638 A1 | 3/2019 | Mammou | |
| 2019/0156518 A1* | 5/2019 | Mammou | ................. G06T 5/80 |
| 2019/0156520 A1* | 5/2019 | Mammou | ................. G08B 1/00 |
| 2019/0311500 A1* | 10/2019 | Mammou | ................. G06T 9/001 |
| 2019/0311502 A1* | 10/2019 | Mammou | ................. G06T 17/00 |
| 2020/0105025 A1* | 4/2020 | Yea | ......................... G06T 15/08 |
| 2021/0209812 A1* | 7/2021 | Han | ....................... H04N 19/46 |

FOREIGN PATENT DOCUMENTS

| | | | |
|---|---|---|---|
| CN | 109859114 A | 6/2019 | |
| CN | 110418135 A | 11/2019 | |
| CN | 110572655 A | 12/2019 | |

OTHER PUBLICATIONS

Gu et al., "3D Point Cloud Attribute Compression via Graph Prediction" (Year: 2020).*

Cohen et al., "Point Cloud Attribute Compression using 3-D Intra Prediction and Shape-Adaptive Transforms" (Year: 2016).*

Wei et al., "Weighted Attribute Prediction Based on Morton Code for Point Cloud Compression" (Year: 2020).*

* cited by examiner

POINT CLOUD ATTRIBUTE PREDICTION METHOD AND DEVICE BASED ON FILTER

CROSS-REFERENCE TO RELATED PATENT APPLICATIONS

The present application is a U.S. national stage application under 35 U.S.C. § 371 of PCT Application No. PCT/CN2020/089592, filed May 11, 2020, which claims priority to Chinese Patent Application No. 202010034025.9, filed Jan. 13, 2020. The disclosures of the aforementioned priority applications are incorporated herein by reference in their entireties.

TECHNICAL FIELD

The present invention relates to the field of point cloud processing, in particular to a point cloud attribute prediction method and device based on a filter.

BACKGROUND ART

A 3D point cloud is an important manifestation of digitalization of the real world. With rapid development of 3D scanning devices (laser type, radar type and the like), the precision and the resolution of a point cloud are higher. A high-precision point cloud is widely applied to construction of city digital maps and provides a technical support for many hot researches on smart city, manless driving, preservation of cultural relics and the like. The point cloud is obtained by sampling the surface of an object through the 3D scanning device, and the number of points of one frame of point cloud is of million level, wherein each point contains attribute information including geometrical information, color and reflectivity, and there is a huge amount of data. The huge data amount of the 3D point cloud poses a huge challenge for data storage and transmission and the like, so point cloud compression is very necessary.

Point cloud compression is mainly divided into geometry compression and attribute compression. At present, point cloud attribute compression frameworks described in a test platform TMC13v8 (Test Model for Category 1&3 version 8) provided by international organization for standardization (Moving Picture Experts Group, MPEG) mainly have the following types:

1. Lifting transform strategy based on Level of Detail (LOD): this method uses a point cloud sequenced according to Morton code to construct LOD firstly, that is, downsampling is conducted on the sequenced points according to a preset layer amount of LOD, the obtained points after each sampling form one layer of LOD, and a sampling distance goes from large to small until construction of the whole LOD is completed; and then neighbor points are found for one point in the point cloud with a LOD sequence, and a weighted mean of attribute values of all the neighbor points is taken as an attribute prediction value, wherein a weight of each neighbor point is a reciprocal value of squared geometric coordinate Euclidean distances from a current point to the neighbor points of the current point; and finally, the attribute prediction value is subtracted from an actual attribute value of the current point to obtain an attribute residual.
2. Predicting transform strategy based on LOD: the process of constructing the LOD in this method is the same as above. After the LOD is constructed, at most K nearest neighbor points are found for each point according to a K-nearest neighbor (KNN) algorithm, and there are K+1 kinds of prediction modes which take attribute values of the first nearest neighbor point, the second nearest neighbor point, ..., the $K_{th}$ nearest neighbor point as prediction reference values and take an attribute weighted average of K nearest neighbor points as a prediction reference value respectively, wherein a weight of each nearest neighbor point is a reciprocal value of squared geometric coordinate Euclidean distances from the current point to the nearest neighbor point of the current point; and then rate distortion optimization (RDO) cost values are calculated for the K+1 prediction reference values and corresponding modes, and a corresponding attribute prediction value of the minimal cost value is taken as the attribute prediction value of the current point.

Meanwhile, there is also a point cloud attribute compression method described in a test platform PCEM v0.1 provided by China AVS (Audio Video coding Standard) Point Cloud Compression Working Group at present, and the point cloud attribute compression method mainly employs a Morton sequence based point cloud prediction method, that is, a current point cloud is subjected to Morton sequencing according to position information of the point cloud, an attribute value of a previous point of the current point based on the Morton sequence is selected as the attribute prediction value of the current point, and finally, the attribute prediction value is subtracted from an actual attribute value of the current point to obtain an attribute residual.

However, the above related technologies conduct attribute prediction after finding neighbor points without considering a position relationship between points among the neighbor points and the other points, and original technologies only consider a position relationship between the neighbor points and the current point, so that a filter is proposed, considering both the position relationship between the neighbor points and the current point and the position relationship between points among the neighbor points and the other points. With respect of 2D image compression according to a traditional rule, a reference point is a top left pixel point generally, and a coded certain pixel value or an average of the certain pixel value is used for prediction; however, considering that distribution of the points in each point cloud is irregular and unordered, when the nearest neighbor points are selected in a pred mode, it cannot be guaranteed that when the nearest neighbor points are selected by the KNN, all the neighbor points are uniformly distributed at the periphery of the current point (the ideal condition, as shown in the right diagram of FIG. 1).

As shown in the left diagram of FIG. 1, in this case, attributes of the points between the point P1 and the point P2 are similar when prediction is conducted with an average mode, and the two points may occupy predominant prediction values when a prediction value is obtained by weighted summation by using space distances, so that the effect of the attribute of the point P1 on the current point is weakened, that is, the prediction value of the current point is relatively close to values of the point P3 and the point P4, which cannot fully use the attribute values of various neighbor points to improve the accuracy of prediction.

By considering the above case, a method based on quick recoloring between the neighbor points is proposed, with considering both a geometrical relationship between the neighbor points and the current point and a geometrical relationship between the neighbor points, so that the prediction solution of the method is more effective.

SUMMARY OF THE INVENTION

The present invention provides a point cloud attribute prediction method and device based on a filter, which improve the compression performance of attributes of point clouds.

The technical solution of the present invention is described as follows:

According to one aspect of the present invention, provided is a point cloud attribute prediction method, comprising: determining K nearest neighbor points of a current point; determining a filter matrix; and determining an attribute prediction value of the current point according to the filter matrix.

According to another aspect of the present invention, provided is a point cloud attribute prediction device, comprising a processor, a memory and a communication bus. A computer readable program which may be executed by the processor is stored on the memory; the communication bus achieves connection communication between the processor and the memory; and the processor achieves the steps of one of the point cloud attribute prediction methods of the above claims when executing the computer readable program.

Compared with the prior art, the present invention has the beneficial effects that:

By using the point cloud attribute prediction method and device based on the filter of the present invention, the accuracy of intra-frame prediction of attributes, and neighbor points in a point cloud sequence is better used to conduct attribute prediction on the current point.

In order to more clearly describe the technical solutions of the embodiments of the present invention, the accompanying drawings required to describe the embodiments or the prior art are briefly described below. Apparently, the accompanying drawings described below are only some embodiments of the present invention. Those of ordinary skill in the art may further obtain other accompanying drawings based on these accompanying drawings without inventive effort.

DETAILED DESCRIPTION OF THE INVENTION

The present invention is further described in the following embodiments in conjunction with the appended drawing, which do not limit the scope of the present invention in any way.

In order to improve the accuracy of intra-frame prediction of attributes and better use neighbor points in a point cloud sequence to conduct attribute prediction on the current point, the present invention provides a point cloud attribute prediction method and device based on a filter, which improve the compression performance of attributes of point clouds.

Figure 2:
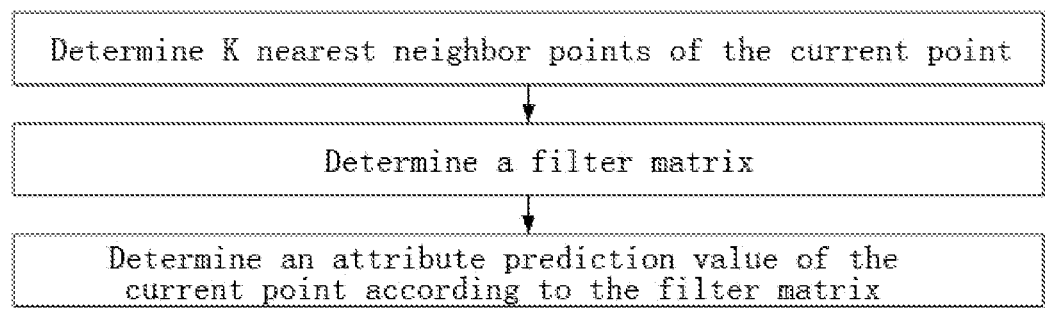
FIG. 2 is a flow chart of an embodiment of a point cloud attribute prediction method provided by the present invention.

As shown in FIG. 2, the point cloud attribute prediction method of the present invention comprises: step 1, determining K nearest neighbor points of a current point; step 2, determining a filter matrix; and step 3, determining an attribute prediction value of the current point according to the filter matrix.

In the step 1, the K nearest neighbor points of the current point are determined by using a method 1, a method 2, a method 3 or a method 4, wherein Method 1: K points at the nearest Euclidean distance from a current point under the L2 norm condition are selected as K nearest neighbor points of the current point.

Method 2: K points at the nearest Manhattan distance from the current point under the L1 norm condition are selected as the K nearest neighbor points of the current point.

Figure 3:
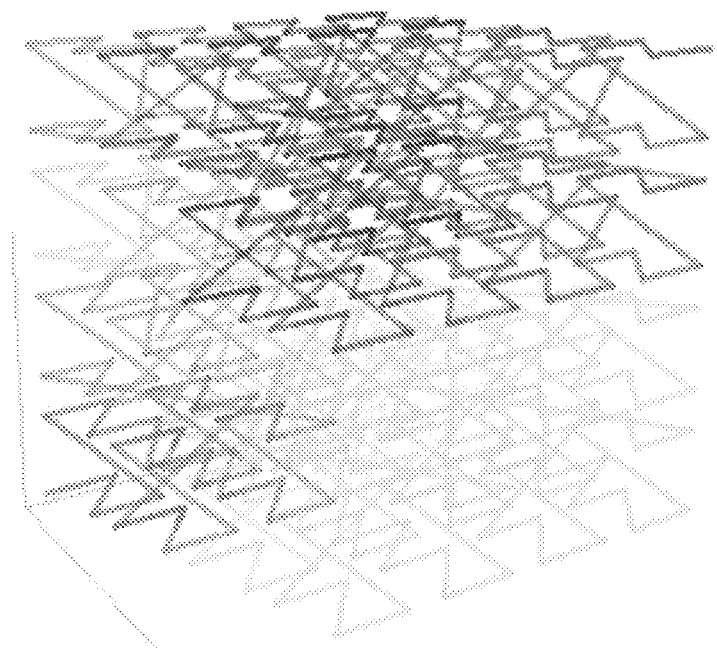
FIG. 3 is a sequencing schematic diagram in a Morton sequence.

Method 3: K points at the nearest distance from the current point after Morton sequencing are selected as the K nearest neighbor points of the current point; and specifically, as shown in FIG. 3, the Morton sequence is expressed as: defining a coordinate of the $K_{th}$ point as $(Xk, Yk, Zk)$, expressed as $$X^k = (x_{N-1}^k x_{N-2}^k \ldots x_1^k x_0^k).$$

$$Y^k = (y_{N-1}^k y_{N-2}^k \ldots y_1^k y_0^k).$$

$$Z^k = (z_{N-1}^k z_{N-2}^k \ldots z_1^k z_0^k).$$

A Morton code corresponding to the Ku point may be expressed as follows:

$$M^k = (x_{N-1}^k y_{N-1}^k z_{N-1}^k, x_{N-2}^k y_{N-2}^k z_{N-2}^k, \ldots x_1^k y_1^k z_1^k, x_0^k y_0^k z_0^k).$$

Each three bits am expressed with an octal number, $m_n^k = (x_n^k y_n^k z_n^k)$, $n=0, 1, \ldots, N-1$ and then the Morton code corresponding to the $K^{th}$ point may be expressed as $$M^k = (m_{N-1}^k m_{N-2}^k \ldots m_1^k m_0^k)$$

Figure 1:
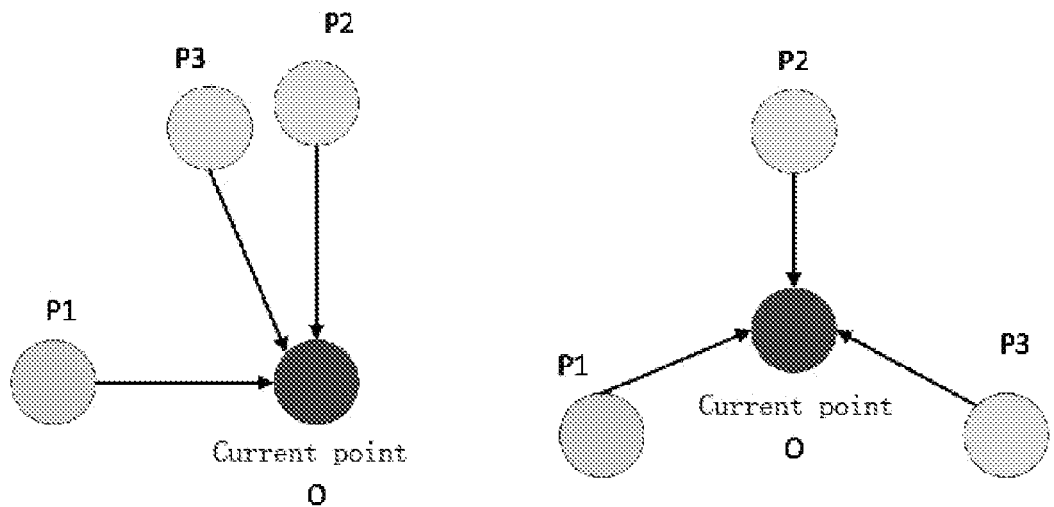
FIG. 1 is a schematic diagram of distribution of neighbor points.

Front K points of the current point after Morton sequencing are found as the K nearest neighbor points of the current point. The sequencing schematic diagram of the Morton sequence is shown in FIG. 1.

Figure 4:
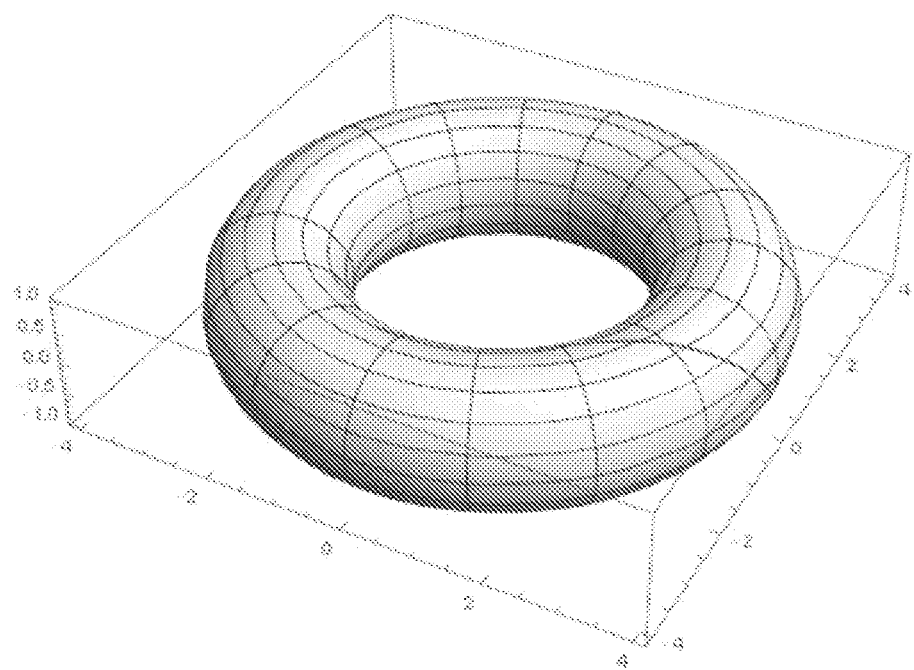
FIG. 4 is a schematic diagram of a geodesic distance.

Method 4: K points at the nearest geodesic distance from the current point are selected as the K nearest neighbor points of the current point; and specifically, as shown in FIG. 4, a connecting line between two points, most approaching a straight line in a curved space, is called track movement of a geodesic line, this distance is called the geodesic distance, K points nearest to the current point are selected as the K nearest neighbor points, and the schematic diagram of the geodesic distance is shown in FIG. 2.

In the step 2, specifically, the filter matrix may be detected by using a method 1, a method 2 or a method 3, wherein Method 1: the filter matrix is determined according to the type of a point cloud or an attribute.

Method 2: the filter matrix is obtained according to weighted calculation of geometrical distances between the K nearest neighbor points.

The filter of the current point is automatically calculated according to the geometrical relationship between the K nearest neighbor points. That is, assuming the filter to be $$\begin{bmatrix} a & b & c \\ e & f & g \\ l & m & n \end{bmatrix},$$

a prediction formula to be $$\begin{bmatrix} R \\ G \\ B \end{bmatrix}^T = \begin{bmatrix} w_1 \\ w_2 \\ w_3 \end{bmatrix}^T \begin{bmatrix} a & b & c \\ e & f & g \\ l & m & n \end{bmatrix} \begin{bmatrix} R_1 & R_2 & R_3 \\ G_1 & G_2 & G_3 \\ B_1 & B_2 & B_3 \end{bmatrix}^T, \begin{bmatrix} R \\ G \\ B \end{bmatrix}:$$

to be a prediction value of the attribute of the current point, $$\begin{bmatrix} R_1 & R_2 & R_3 \\ G_1 & G_2 & G_3 \\ B_1 & B_2 & B_3 \end{bmatrix}$$

to be an attribute matrix formed by 3 nearest neighbor points of the current point, $$\begin{bmatrix} w_1 \\ w_2 \\ w_3 \end{bmatrix}$$

to be a weight matrix of the 3 nearest neighbor points of the current point, a calculation formula to be $$w_j = \sum_{j \in N_i} \frac{\frac{1}{\delta_j^2}}{\sum_{j \in N_i} \frac{1}{\delta_j^2}},$$

wherein $(\delta_j)_{j \in N_i}$ represents a distance from the $j_{th}$ neighbor point to the current point, and Ni represents the number of the neighbor points, which is assumed as 3 here.

Let a=f=n be a set fixed value (a number between 0 and 1), $$b = (1-a) * \frac{dist12}{dist12 + dist13} \text{ or } b = (1-a) * \frac{\left(\frac{1}{dist12}\right)}{\left(\frac{1}{dist12}\right) + \left(\frac{1}{dist13}\right)}$$

$$c = (1-a) * \frac{dist13}{dist12 + dist13} \text{ or } c = (1-a) * \frac{\left(\frac{1}{dist13}\right)}{\left(\frac{1}{dist12}\right) + \left(\frac{1}{dist13}\right)}$$

$$e = (1-f) * = \frac{dist21}{dist21 + dist23} \text{ or } e = (1-f) * \frac{\left(\frac{1}{dist21}\right)}{\left(\frac{1}{dist21}\right) + \left(\frac{1}{dist23}\right)}$$

$$g = (1-f) * \frac{dist23}{dist21 + dist23} \text{ or } g = (1-f) * \frac{\left(\frac{1}{dist23}\right)}{\left(\frac{1}{dist21}\right) + \left(\frac{1}{dist23}\right)}$$

$$l = (1-n) * \frac{dist31}{dist31 + dist32} \text{ or } l = (1-n) * \frac{\left(\frac{1}{dist31}\right)}{\left(\frac{1}{dist31}\right) + \left(\frac{1}{dist32}\right)}$$

$$m = (1-n) * \frac{dist32}{dist31 + dist32} \text{ or } m = (1-n) * \frac{\left(\frac{1}{dist32}\right)}{\left(\frac{1}{dist31}\right) + \left(\frac{1}{dist32}\right)},$$

wherein dist13=dist31, dist12=dist21, dist23=dist32, and $dist_{ij}$ represent a distance from the $i_{th}$ neighbor point to the $j_{th}$ neighbor point. The filter of the current point in a current point cloud is solved by using the geometrical relationship. Finally, the filter is determined to be $$\begin{bmatrix} a & b & c \\ e & f & g \\ l & m & n \end{bmatrix}$$

Method 3: the filter matrix is determined according to a relationship of sizes of geometrical distances between the K nearest neighbor points. That is, assuming the filter to be $$\begin{bmatrix} a & b & c \\ e & f & g \\ l & m & n \end{bmatrix},$$

a prediction formula to be $$\begin{bmatrix} R \\ G \\ B \end{bmatrix}^T = \begin{bmatrix} w_1 \\ w_2 \\ w_3 \end{bmatrix}^T \begin{bmatrix} a & b & c \\ e & f & g \\ l & m & n \end{bmatrix} \begin{bmatrix} R_1 & R_2 & R_3 \\ G_1 & G_2 & G_3 \\ B_1 & B_2 & B_3 \end{bmatrix}^T, \begin{bmatrix} R \\ G \\ B \end{bmatrix}:$$

to be a prediction value of the attribute of the current point, $$\begin{bmatrix} R_1 & R_2 & R_3 \\ G_1 & G_2 & G_3 \\ B_1 & B_2 & B_3 \end{bmatrix}$$

to be an attribute matrix formed by 3 nearest neighbor points of the current point, $$\begin{bmatrix} w_1 \\ w_2 \\ w_3 \end{bmatrix}$$

to be a weight matrix of the 3 nearest neighbor points of the current point, a calculation formula to be $$w_j = \sum_{j \in N_i} \frac{\frac{1}{\delta_j^2}}{\sum_{j \in N_i} \frac{1}{\delta_j^2}},$$

wherein $(\delta_j)_{j \in N_i}$ represents a distance from the $j_{th}$ neighbor point to the current point, and Ni represents the number of the neighbor points, which is assumed as 3 here.

Let $a=f=n$ be a set fixed value (a number between 0 and 1), wherein dist13=dist31, dist12=dist21, dist23=dist32, and $dist_{ij}$ represents a distance from the $i_{th}$ neighbor point to the $j_{th}$ neighbor point. Parameters are selected according to the relationship of the sizes of the distances; and assuming that $a=f=m=F$ (F may be an arbitrary number between 0 and 1), the sizes of the distances are compared.

If dist12<dist13, setting that b=01, c=02, or otherwise, setting that c=01, b=02.

In a similar way, if dist21<dist23, setting that e=P1, g=P2, or otherwise, setting that g=P1, e=P2.

In a similar way, if dist31<dist32, setting that l=Q1, m=Q2, or otherwise, setting that m=Q1, l=Q2.

The filter of the current point in the current point cloud is solved by using the geometrical relationship. Finally, the filter is determined to be $$\begin{bmatrix} a & b & c \\ e & f & g \\ l & m & n \end{bmatrix}.$$

Before the filter matrix is finally determined, the step 2 further comprises a method 1 or a method 2.

Method 1, the filter matrix is directly employed as a final filter matrix when being a decimal.

Method 2, when the filter matrix is the decimal, operation of converting a fixed-point number to a floating-point umber is conducted.

For example, $$\begin{bmatrix} 0.75 & 0.125 & 0.125 \\ 0.125 & 0.75 & 0.125 \\ 0.125 & 0.125 & 0.75 \end{bmatrix},$$

wherein the matrix is also equal to $$\begin{bmatrix} 6/8 & 1/8 & 1/8 \\ 1/8 & 6/8 & 1/8 \\ 1/8 & 1/8 & 6/8 \end{bmatrix},$$

then fixed-point number conversion is conducted on the filter matrix, and the matrix is changed into $$\begin{bmatrix} 6 & 1 & 1 \\ 1 & 6 & 1 \\ 1 & 1 & 6 \end{bmatrix},$$

and finally, an attribute prediction value is shifted 3 bits to the right (that is, divided by 8) wholly after being calculated to obtain the attribute prediction value.

On the coding side, determining the filter matrix further comprises: sequentially selecting parameter values of the filter matrix within a set parameter value range of the filter matrix, sequentially calculating corresponding code stream sizes and distortion values according to the parameter values of the filter, calculating rate distortion values according to the code stream sizes and the distortion values, and selecting the filter matrix corresponding to the minimal rate distortion value. On the coding side, determining the filter matrix further comprises a method 1, a method 2, or a method 3, wherein method 1: values of the parameters of the filter matrix are directly coded into the code streams.

Method 2: a fixed value is subtracted from the values of the parameters of the filter matrix, and then difference values are coded into the code streams. For example, $$\begin{bmatrix} 0.75 & 0.125 & 0.125 \\ 0.125 & 0.75 & 0.125 \\ 0.125 & 0.125 & 0.75 \end{bmatrix},$$

the fixed value of 0.125 is subtracted, and then obtained is $$\begin{bmatrix} 0.625 & 0 & 0 \\ 0 & 0.625 & 0 \\ 0 & 0 & 0.625 \end{bmatrix}.$$

Method 3: index values of the filter are coded into the code streams.

Figure 5:
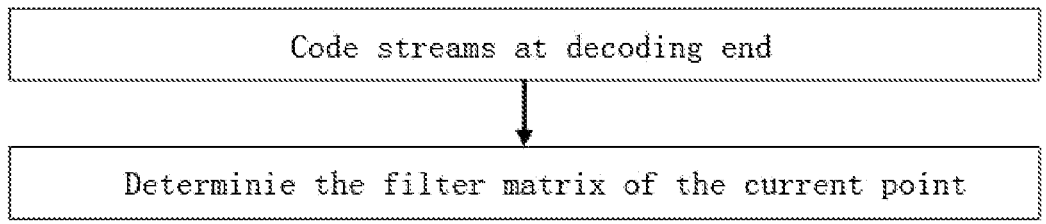
FIG. 5 is a schematic diagram of a point cloud attribute prediction device of the present invention.
Figure 6:
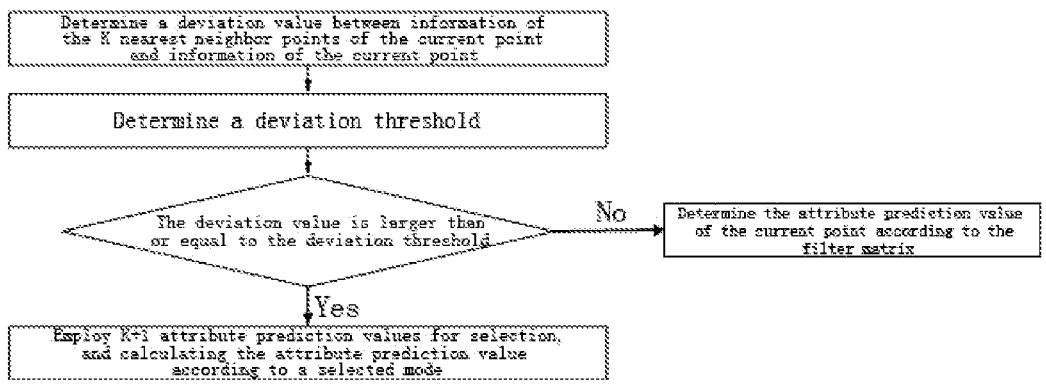
FIG. 6 is a flow chart of another embodiment of a point cloud attribute prediction method on the decoding side provided by the present invention.

As shown in FIG. 5, on the decoding side, determining the filter matrix further comprises: determining the filter matrix of the current point according to the code streams by using a method 1, a method 2 or a method 3, wherein method 1: the directly decoded filter matrix is taken as the filter matrix of the current point according to point cloud attribute code streams.

Method 2: parameters of the directly decoded filter matrix plus a fixed value are taken as the filter matrix of the current int according to the point cloud attribute code streams. For example, $$\begin{bmatrix} 0.625 & 0 & 0 \\ 0 & 0.625 & 0 \\ 0 & 0 & 0.625 \end{bmatrix},$$

the fixed value of 0.125 is added, and then obtained is $$\begin{bmatrix} 0.75 & 0.125 & 0.125 \\ 0.125 & 0.75 & 0.125 \\ 0.125 & 0.125 & 0.75 \end{bmatrix}.$$

Method 3: the filter matrix obtained by looking up an index table according to the index values of the decoded filter is taken as the filter matrix of the current point according to the point cloud attribute code streams.

In the step 3, determining the attribute prediction value of the current point according to the filter matrix further comprises:

calculating products of the filter matrix and the attribute values of the K nearest neighbor points of the current point to obtain updated attribute values of the K nearest neighbor points, and calculating a weighted sum by multiplying the updated attribute values of the K nearest neighbor points with a weight vector as the attribute prediction value of the current point; or calculating a weighted sum by multiplying the filter matrix with the weight vector as an updated weight vector, and calculating a weighted sum by multiplying the attribute values of the K nearest neighbor points with the updated weight vector as the attribute prediction value of the current point.

Calculation formulas of the above two are as follows:
When K is defined as 3, $$\begin{bmatrix}R\\G\\B\end{bmatrix}^T = \begin{bmatrix}w_1\\w_2\\w_3\end{bmatrix}^T \left(\begin{bmatrix}a & b & c\\e & f & g\\l & m & n\end{bmatrix}\begin{bmatrix}R_1 & R_2 & R_3\\G_1 & G_2 & G_3\\B_1 & B_2 & B_3\end{bmatrix}^T\right) =$$

$$\left(\begin{bmatrix}w_1\\w_2\\w_3\end{bmatrix}^T\begin{bmatrix}a & b & c\\e & f & g\\l & m & n\end{bmatrix}\right)\begin{bmatrix}R_1 & R_2 & R_3\\G_1 & G_2 & G_3\\B_1 & B_2 & B_3\end{bmatrix}^T$$

wherein $$\begin{bmatrix}R\\G\\B\end{bmatrix}$$

is the attribute prediction value of the current point, $$\begin{bmatrix}a & b & c\\e & f & g\\l & m & n\end{bmatrix}$$

is the filter matrix, $$\begin{bmatrix}R_1 & R_2 & R_3\\G_1 & G_2 & G_3\\B_1 & B_2 & B_3\end{bmatrix}$$

is an attribute matrix formed by 3 nearest neighbor points of the current point, $$\begin{bmatrix}w_1\\w_2\\w_3\end{bmatrix}$$

is a weight matrix of 3 nearest neighbor points of the current point, and the calculation formula is $$w_j = \sum_{j \in N_i} \frac{\frac{1}{\delta_j^2}}{\sum_{j \in N_i} \frac{1}{\delta_j^2}},$$

wherein $(\delta_j)_{j \in N_i}$ represents a distance from the $j_{th}$ neighbor point to the current point, and Ni represents the number of the neighbor points, which is assumed to be 3 here.

On the coding side, determining the attribute prediction value of the current point according to the filter matrix further comprises:

1) determining a deviation value between information of the K nearest neighbor points of the current point and information of the current point, specifically, determining the deviation value between the information of the K nearest neighbor points of the current point and the information of the current point by using a method 1, a method 2 or a method 3, wherein method 1: a center-of-mass coordinate value of the K nearest neighbor points of the current point is calculated, denoted by $P_{center-of-mass}$; and $P_{current\ point}$ represents a coordinate value of the current point, and an Euclidean distance from the coordinate value of the current point to the center-of-mass coordinate value is calculated, denoted by a deviation value Y:

deviation value $Y = d|P_{current\ point} - P_{center-of-mass}|$

Method 2: a maximum deviation or an average deviation of the position coordinate P between two points of the K nearest neighbor points of the current point in each direction is calculated as the deviation value Y:

deviation value $Y = \max(P_i - P_j)$ or deviation value' = $\mathrm{average}(P_i - P_j)$ wherein $1 \leq i \leq K$, $1 \leq j \leq K$, $i \neq j$.

Method 3: a maximum deviation or an average deviation between attributes C of two points of the K nearest neighbor points of the current point is calculated as the deviation value Y:

deviation value = $\max(C_i - C_j)$ or deviation value = $\mathrm{average}(C_i - C_j)$ wherein $1 \leq i \leq K$, $1 \leq j \leq K$, $i \neq j$.

2) Determining a deviation threshold, comprising: determining the deviation threshold by using a method 1 or a method 2, wherein method 1: a specific threshold is employed for a class of specific point cloud sequence according to different point cloud types or attribute types.

Method 2: parameters of the deviation threshold am changed, different threshold parameters are selected within a set range of the deviation threshold, sums of the code stream sizes and the distortion values at different threshold parameters are calculated to obtain rate distortion values, and a threshold corresponding to the minimal rate distortion value is selected as the deviation threshold.

3) When the deviation value is larger than or equal to the deviation threshold: taking attribute values of the K nearest neighbor points as attribute prediction values respectively, and determining the attribute prediction value of the current point according to the filter matrix to obtain total K+1 attribute prediction values; calculating corresponding K+1 residuals according to the K+1 attribute prediction values respectively; calculating corresponding K+1 code stream sizes and corresponding K+1 deviation values according to the K+1 residuals respectively; calculating corresponding K+1 rate distortion values according to the K+1 code stream sizes and the K+1 deviation values; and selecting an attribute prediction value corresponding to the minimal rate distortion value as the attribute prediction value of the current point according to the K+1 rate distortion values;

or when the deviation value is smaller than the deviation threshold: determining the attribute prediction value of the current point according to the filter matrix.

Determining the attribute prediction value of the current point according to the filter matrix further comprises: coding an attribute prediction mode corresponding to the attribute prediction value of the current point into the code streams.

On the decoding side, determining the attribute prediction value of the current point according to the filter matrix further comprises: solving the attribute prediction mode according to the point cloud attribute code streams; and determining the attribute prediction value of the current point according to the attribute prediction mode.

Figure 7:
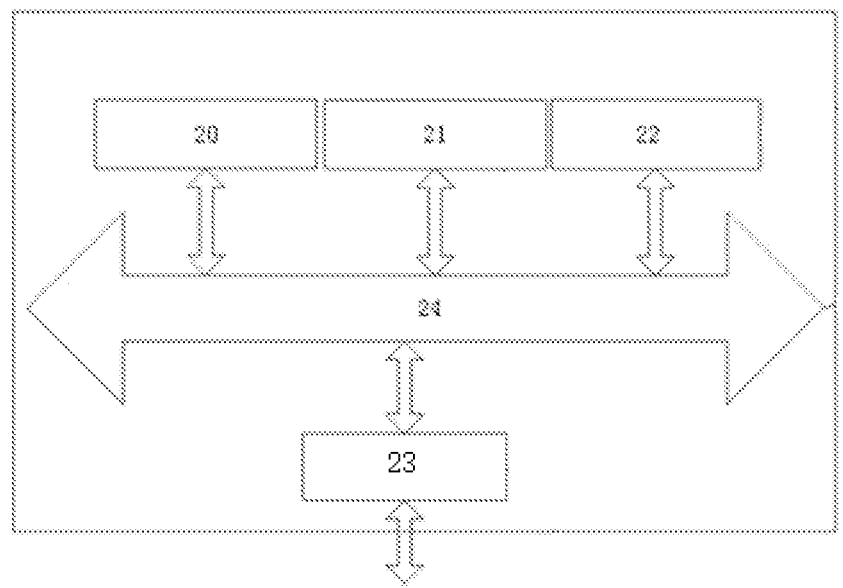
FIG. 7 is a flow chart of another embodiment of a point cloud attribute prediction method on the coding side provided by the present invention.

As shown in FIG. 7, the point cloud attribute prediction device of the present invention comprises a processor 20, a display screen 21, a memory 22, a communication interface 23 and a communication bus 24. A computer readable program which may be executed by the processor is stored on the memory 22; the communication bus 24 achieves connection communication between the processor 20 and the memory 22; and the processor 20 achieves the steps in the above point cloud attribute prediction method when executing the computer readable program, as shown in FIG. 3.

In order to verify the effect of the present invention, the performance of the embodiments of the method of the present invention is compared with that of a benchmark result of a test platform TMC13v8.

Embodiment 1: in this solution, 3 nearest neighbor points found based on a KNN Euclidean distance is employed; as for a color attribute, an employed filter matrix is $$\begin{bmatrix} 0.75 & 0.125 & 0.125 \\ 0.125 & 0.75 & 0.125 \\ 0.125 & 0.125 & 0.75 \end{bmatrix},$$

a deviation between attribute information of the neighbor points is employed for selection of a threshold, and the threshold is selected as 64; and as for a reflectivity attribute, the employed filter matrix is $$\begin{bmatrix} 0.8 & 0.1 & 0.1 \\ 0.1 & 0.8 & 0.1 \\ 0.1 & 0.1 & 0.8 \end{bmatrix},$$

a deviation between attribute information of the neighbor points is employed for selection of the threshold, and the threshold is selected as 64.

Results are as shown in Table 1 and Table 2, wherein Table 1 shows a performance comparison diagram of the embodiment of the method of the present invention and a benchmark result of a currently latest basic platform TMC13v8 of Moving Picture Experts Group (MPEG) under the conditions of lossless geometry and lossless attributes (employing LOD based prediction transformation); and Table 2 shows a performance comparison diagram of the embodiment of the method of the present invention and a benchmark result of the test platform TMC13v8 under the conditions of loss geometry and loss attributes (employing LOD based prediction transformation).

Table 1 Test Form Under Lossless Geometry and Lossless Attributes (Comparing with Currently Latest Basic Platform TMC13v8)

| Lossless geometry, lossless attribute | End-to-end attribute rate distortion (inter-frame) | | | |
|---|---|---|---|---|
| (CW) | Geometry | Color | Reflectivity | Total |
| First kind of data set | 100.0% | 99.9% | No | 99.9% |
| Fused data set of third kind of data set | 100.0% | 99.9% | 99.9% | 99.9% |
| Average | 100.0% | 99.9% | 99.9% | 100.0% |

Table 2 Test Form Under Lossless Geometry and Limited Loss Attributes (Comparing with Currently Latest Basic Platform TMC13v8)

| Lossless geometry, limited loss attribute | End-to-end attribute rate distortion (inter-frame) | | | |
|---|---|---|---|---|
| (CY) | Brightness | Chromaticity Cb | Chromaticity Cr | Reflectivity |
| First kind of data set | −0.7% | −0.7% | −0.7% | No |
| Fused data set of third kind of data set | −0.6% | −0.6% | −0.6% | −0.4% |
| Average | −0.7% | −0.7% | −0.7% | −0.4% |

Under the conditions of lossless geometry and lossless attributes, a color code rate of the present invention only requires 99.9%, and a reflectivity code rate of the present invention only requires 99.9% (as shown in Table 1).

As for a brightness attribute, under the conditions of lossless geometry and limited loss attributes, end-to-end rate distortion of the present invention is saved by 0.7% (as shown in Table 2).

As for a chromaticity attribute, under the conditions of lossless geometry and limited loss attributes, end-to-end rate distortion of the present invention is saved by 0.7% (as shown in Table 2).

As for the chromaticity attribute, under the conditions of lossless geometry and limited loss attributes, end-to-end rate distortion of the present invention is saved by 0.7% (as shown in Table 2).

As for the reflectivity attribute, under the conditions of lossless geometry and limited loss attributes, end-to-end rate distortion of the present invention is saved by 0.4% (as shown in Table 2).

Embodiment 2: in this solution, 3 nearest neighbor points found based on a KNN Euclidean distance is employed; and as for a color attribute, a filter of a current point is automatically calculated according to a geometrical relationship between K nearest neighbor points. That is, the filter is assumed as $$\begin{bmatrix} a & b & c \\ e & f & g \\ l & m & n \end{bmatrix},$$

and let a=f=n=0.6, wherein dist13=dist31, dist12=dist21, dist23=dist32, and $dist_{ij}$ represents a distance from the $i_{th}$ neighbor point to the $j_{th}$ neighbor point. Parameters are selected according to the relationship of the sizes of the distances; and assuming that a=F=m=F (F may be an arbitrary number between 0 and 1), the sizes of the distances are compared.

If dist12<dist13, setting that b=0.1, c=0.3, or otherwise, setting that c=0.1, b=0.3.

In a similar way, if dist21<dist23, setting that e=0.1, g=0.3, or otherwise, setting that g=0.1, e=0.3.

In a similar way, if dist31<dist32, setting that l=0.1, m=0.3, or otherwise, setting that m=0.1, l=0.3. A deviation between attribute information of the neighbor points is employed for selection of a threshold and the threshold is selected as 64.

Table 3 Test Form Under Lossless Geometry and Lossless Attributes (Comparing with Currently Latest Basic Platform TMC13v8)

| Lossless geometry, lossless attribute | End-to-end attribute rate distortion (inter-frame) | | | |
|---|---|---|---|---|
| (CW) | Geometry | Color | Reflectivity | Total |
| First kind of data set | 100.0% | 99.6% | No | 99.7% |
| Fused data set of third kind of data set | 100.0% | 100.0% | 100.0% | 100.0% |
| Average | 100.0% | 99.6% | 100.0% | 99.9% |

Table 4 Test Form Under Lossless Geometry and Limited Loss Attributes (Comparing with Currently Latest Basic Platform TMC13v8)

| Lossless geometry, limited loss attribute | End-to-end attribute rate distortion (inter-frame) | | | |
|---|---|---|---|---|
| (CY) | Brightness | Chromaticity Cb | Chromaticity Cr | Reflectivity |
| First kind of data set | −2.2% | −2.2% | −2.2% | No |
| Fused data set of third kind of data set | −0.5% | −0.5% | −0.5% | 0.0% |
| Average | −2.0% | −2.0% | −2.0% | 0.0% |

Under the conditions of lossless geometry and lossless attributes, a color code rate of the present invention only requires 99.9% (as shown in Table 3).

As for a brightness attribute, under the conditions of lossless geometry and limited loss attributes, end-to-end rate distortion of the present invention is saved by 2.0% (as shown in Table 4).

As for a chromaticity attribute, under the conditions of lossless geometry and limited loss attributes, end-to-end rate distortion of the present invention is saved by 2.0% (as shown in Table 4).

As for the chromaticity attribute, under the conditions of lossless geometry and limited loss attributes, end-to-end rate distortion of the present invention is saved by 2.0% (as shown in Table 4).

Embodiment 3: in this solution, 3 nearest neighbor points found based on a KNN Euclidean distance is employed; and as for a color attribute, a filter of a current point is automatically calculated according to a geometrical relationship between K nearest neighbor points, and fixed-point number conversion is conducted on the filter. That is, the filter is assumed as $$\begin{bmatrix} a & b & c \\ e & f & g \\ l & m & n \end{bmatrix},$$

and let a=f=n=4, wherein dist13=dist31, dist12=dist21, dist23=dist32, and $dist_{ij}$ represents a distance from the $i_{th}$ neighbor point to the $j_{th}$ neighbor point. Parameters are selected according to the relationship of the sizes of the distances; and assuming that a=f=m=F, the sizes of the distances are compared.

If dist12<dist13, setting that b=1, c=3, or otherwise, setting that c=1, b=3.

In a similar way, if dist21<dist23, setting that e=1, g=3, or otherwise setting that g=1, e=3.

In a similar way, if dist31<dist32, setting that l=1, m=3, or otherwise setting that m=1, l=3.

A deviation between attribute information of the neighbor points is employed for selection of a threshold, and the threshold is selected as 64. An attribute prediction value is solved by shifting 3 bits to the right when being calculated finally. Compared with Embodiment 2, this solution has the advantages that the filter matrix is of a fixed-point number, floating-point number calculation cannot be introduced, and storage by the device is facilitated.

TABLE 5

Test Form Under Lossless Geometry And Lossless Attributes (Comparing With Latest Platform TMC13v9.1)

| Lossless geometry, lossless attribute | End-to-end attribute rate distortion (inter-frame) | | | |
|---|---|---|---|---|
| (CW) | Geometry | Color | Reflectivity | Total |
| First kind of data set A | 100.0% | 99.8% | No | 99.9% |
| First kind of data set B | 100.0% | 100.6% | No | 100.1% |
| Fused data set of third kind of data set | 100.0% | 100.2% | 100.0% | 100.1% |
| Average | 100.0% | 100.2% | 100.0% | 100.1% |

TABLE 6

Test Form Under Lossless Geometry And Limited Loss Attributes (Comparing With Latest Platform TMC13v9.1)

| Lossless geometry, limited loss attribute | End-to-end attribute rate distortion (inter-frame) | | | |
|---|---|---|---|---|
| (CY) | Brightness | Chromaticity Cb | Chromaticity Cr | Reflectivity |
| First kind of data set A | −2.0% | −2.0% | −2.0% | No |
| First kind of data set B | −0.8% | −0.8% | −0.8% | No |
| Fused data set of third kind of data set | −0.5% | −0.5% | −0.5% | 0.0% |
| Average | −1.3% | −1.3% | −1.3% | 0.0% |

As or a brightness attribute, under conditions of lossless geometry and limited loss attributes, end-to-end rate distortion of the present invention is saved by 1.3% (as shown in Table 6).

As for a chromaticity attribute, under the conditions of lossless geometry and limited loss attributes, end-to-end rate distortion of the present invention is saved by 1.3% (as shown in Table 6).

As for the chromaticity attribute, under the conditions of lossless geometry and limited loss attributes, end-to-end rate distortion of the present invention is saved by 1.3% (as shown in Table 6).

INDUSTRIAL APPLICABILITY

A point cloud attribute prediction method and device based on a filter of the present invention are suitable for 3D scanning devices (laser type, radar type and the like), are widely applied to construction of city digital maps and provide a technical support for many hot researches on smart city, manless driving, preservation of cultural relics and the like. The above embodiments are merely specific implementations of the present invention for purpose of illustration rather than to limit the present invention, but the present invention is not restricted thereto. Although the present invention has been described in detail with respect to the previously described embodiments, it should be appreciated by one skilled in art, those familiar with the art may still make modification or readily contemplated changes on the technical solutions recorded in the embodiments, or make equivalent substitutions on part of its technical features; and such modifications changes or substitutions do not deviate the nature of the technical solutions from the spirit and scope of the technical solutions of the various embodiments in the present invention, and should fall within the extent of protection of the present invention. Therefore, the protection scope of the present invention should be defined only in accordance with the appended claims.

The invention claimed is:

1. A point cloud attribute prediction method based on a filter, comprising:
    processing, by at least one processor, K nearest neighbor points of a current point;
    processing, by the at least one processor, a filter matrix; and
    processing, by the at least one processor, an attribute prediction value of the current point according to the filter matrix;
    wherein, on a coding side, the processing the attribute prediction value of the current point according to the filter matrix comprises:
    processing, by the at least one processor, a deviation value between information of the K nearest neighbor points of the current point and information of the current point;
    processing, by the at least one processor, a deviation threshold; and
    when the deviation value is larger than or equal to the deviation threshold: taking attribute values of the K nearest neighbor points as attribute prediction values respectively, and processing, by the at least one processor, the attribute prediction value of the current point according to the filter matrix to obtain total K+1 attribute prediction values; calculating, by the at least one processor, corresponding K+1 residuals according to the K+1 attribute prediction values respectively; calculating, by the at least one processor, corresponding K+1 code stream sizes and corresponding K+1 deviation values according to the K+1 residuals respectively; calculating, by the at least one processor, corresponding K+1 rate distortion values according to the K+1 code stream sizes and the K+1 deviation values; and selecting, by the at least one processor, an attribute prediction value corresponding to the minimal rate distortion value as the attribute prediction value of the current point according to the K+1 rate distortion values.

2. The point cloud attribute prediction method based on the filter according to claim 1, wherein the K nearest neighbor points of the current point are determined by using a method 1, a method 2, a method 3 or a method 4, wherein
    method 1: selecting, by the at least one processor, K points at a nearest Euclidean distance from the current point under a L2 norm condition as the K nearest neighbor points of the current point;
    method 2: selecting, by the at least one processor, K points at a nearest Manhattan distance from the current point under a L1 norm condition as the K nearest neighbor points of the current point;
    method 3: selecting, by the at least one processor, K points at a nearest distance from the current point after Morton sequencing as the K nearest neighbor points of the current point; and
    method 4: selecting, by the at least one processor, K points at a nearest geodesic distance from the current point as the K nearest neighbor points of the current point.

3. The point cloud attribute prediction method based on the filter according to claim 1, wherein the filter matrix is determined by using a method 1, a method 2 or a method 3, and the filter matrix may be a fixed-point number matrix and may also be a floating-point number matrix, wherein
    method 1: determining, by the at least one processor, the filter matrix according to a type of a point cloud or an attribute;
    method 2: obtaining, by the at least one processor, the filter matrix according to weighted calculation of geometrical distances between the K nearest neighbor points; and
    method 3: determining, by the at least one processor, the filter matrix according to a relationship of sizes of geometrical distances between the K nearest neighbor points.

4. The point cloud attribute prediction method based on the filter according to claim 1, wherein, on the coding side, the determining the filter matrix comprises:
    sequentially selecting, by the at least one processor, parameter values of the filter matrix within a set parameter value range of the filter matrix, sequentially calculating, by the at least one processor, corresponding code stream sizes and distortion values according to the parameter values of the filter, calculating, by the at least one processor, rate distortion values according to the code stream sizes and the distortion values, and selecting, by the at least one processor, the filter matrix corresponding to a minimal rate distortion value.

5. The point cloud attribute prediction method based on the filter according to claim 4, wherein, on the coding side, further comprising: coding, by the at least one processor, the filter matrix into code streams by using a method 1, a method 2 or a method 3, wherein
    method 1: coding, by the at least one processor, values of parameters of the filter matrix directly into the code streams;

method 2: subtracting, by the at least one processor, a fixed value from the values of the parameters of the filter matrix, and then coding difference values into the code streams; and method 3: coding, by the at least one processor, index values of the filter into the code streams.

6. The point cloud attribute prediction method based on the filter according to claim 1, wherein, on a decoding side, further comprising: determining the filter matrix of the current point by using a method 1, a method 2 or a method 3 according to the code streams, wherein method 1: taking, by the at least one processor, a directly decoded filter matrix as the filter matrix of the current point according to point cloud attribute code streams;

method 2: taking, by the at least one processor, parameters of a directly decoded filter matrix plus a fixed value as the filter matrix of the current point according to the point cloud attribute code streams; and method 3: taking, by the at least one processor, the filter matrix obtained by looking up an index table according to index values of the decoded filter as the filter matrix of the current point according to the point cloud attribute code streams.

7. The point cloud attribute prediction method based on the filter according to claim 6, wherein, on the decoding side, the determining the attribute prediction value of the current point according to the filter matrix further comprises:

solving, by the at least one processor, the attribute prediction mode according to the point cloud attribute code streams; and processing, by the at least one processor, an attribute prediction value of the current point according to the attribute prediction mode.

8. The point cloud attribute prediction method based on the filter according to claim 1, wherein the determining the attribute prediction value of the current point according to the filter matrix comprises:

calculating, by the at least one processor, products of the filter matrix and the attribute values of the K nearest neighbor points of the current point to obtain updated attribute values of the K nearest neighbor points, and calculating a weighted sum by multiplying the updated attribute values of the K nearest neighbor points with a weight vector as the attribute prediction value of the current point; or calculating, by the at least one processor, a weighted sum by multiplying the filter matrix with the weight vector as an updated weight vector, and calculating, by the at least one processor, a weighted sum by multiplying the attribute values of the K nearest neighbor points with the updated weight vector as the attribute prediction value of the current point.

9. The point cloud attribute prediction method based on the filter according to claim 1, wherein a deviation value between information of the K nearest neighbor points of the current point and information of the current point is determined by using a method 1, a method 2 or a method 3, wherein method 1: calculating, by the at least one processor, a center-of-mass coordinate value of the K nearest neighbor points of the current point, and calculating an Euclidean distance from a coordinate value of the current point to the center-of-mass coordinate value as a deviation value;

method 2: calculating, by the at least one processor, a maximum deviation or an average deviation of the position coordinate between two points of the K nearest neighbor points of the current point in each direction as the deviation value; and method 3: calculating, by the at least one processor, a maximum deviation or an average deviation between attributes of two points of the K nearest neighbor points of the current point as the deviation value.

10. The point cloud attribute prediction method based on the filter according to claim 1, wherein the deviation threshold is determined by using a method 1 or a method 2, wherein method 1: employing, by the at least one processor, a specific deviation threshold for a class of specific point cloud sequence according to different point cloud types or attribute types; and method 2: changing, by the at least one processor, parameters of the deviation threshold, selecting, by the at least one processor, different threshold parameters within a set range of the deviation threshold, calculating, by the at least one processor, sums of the code stream sizes and the distortion values at different threshold parameters to obtain rate distortion values, and selecting, by the at least one processor, a threshold corresponding to the minimal rate distortion value as the deviation threshold.

11. The point cloud attribute prediction method based on the filter according to claim 1, wherein the determining the attribute prediction value of the current point according to the filter matrix further comprises:

coding, by the at least one processor, an attribute prediction mode corresponding to the attribute prediction value of the current point into the code streams.

12. A point cloud attribute prediction device based on a filter, comprising a processor, a memory and a communication bus; a computer readable program which may be executed by the processor is stored on the memory;

the communication bus achieves connection communication between the processor and the memory; and the processor achieves the steps in the point cloud attribute prediction method based on the filter according to claim 1 when executing the computer readable program.

* * * * *